(12) United States Patent
Seiferlein et al.

(10) Patent No.: US 11,072,225 B2
(45) Date of Patent: Jul. 27, 2021

(54) FILTER APPARATUS FOR A MOTOR VEHICLE, AND METHOD FOR OPERATING SUCH A FILTER APPARATUS

(71) Applicant: Bayerische Motoren Werke Aktiengesellschaft, Munich (DE)

(72) Inventors: Mara Seiferlein, Calw (DE); Hendrik Bernau, Nuertingen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 216 days.

(21) Appl. No.: 16/266,350

(22) Filed: Feb. 4, 2019

(65) Prior Publication Data

US 2019/0168584 A1 Jun. 6, 2019

Related U.S. Application Data

(63) Continuation of application No. PCT/EP2017/069648, filed on Aug. 3, 2017.

(30) Foreign Application Priority Data

Aug. 23, 2016 (DE) ..................... 10 2016 215 853.8

(51) Int. Cl.
*B60H 3/00* (2006.01)
*B01D 46/42* (2006.01)
(Continued)

(52) U.S. Cl.
CPC ....... *B60H 3/0078* (2013.01); *B01D 46/0027* (2013.01); *B01D 46/429* (2013.01);
(Continued)

(58) Field of Classification Search
CPC .............. B01D 46/429; B01D 2279/50; B01D 46/0027; B60H 1/00657; B60H 1/00828;
(Continued)

(56) References Cited

U.S. PATENT DOCUMENTS

| 4,530,817 A | 7/1985 | Hoelter et al. |
| 9,266,405 B1 | 2/2016 | Blanchard |

(Continued)

FOREIGN PATENT DOCUMENTS

| CN | 104833065 A | 8/2015 |
| CN | 204774507 U | 11/2015 |

(Continued)

OTHER PUBLICATIONS

Machine translation of CN 204774507 (Year: 2015).*

(Continued)

*Primary Examiner* — Robert Clemente
(74) *Attorney, Agent, or Firm* — Crowell & Moring LLP

(57) ABSTRACT

A filter apparatus for a motor vehicle is provided. The filter apparatus includes a delivery device, which is provided in addition to a ventilation system of the motor vehicle and can be operated independently of the ventilation system for drawing in and delivering air from the interior of the motor vehicle. The filter apparatus includes at least one filter element, through which can flow the air drawn in and delivered by the delivery device for filtering the air. The filter apparatus includes at least one outlet for introducing the air filtered by way of the filter element into the interior. The filter apparatus is designed to wirelessly receive at least one signal emitted by a terminal and to activate the delivery device based on the signal.

11 Claims, 1 Drawing Sheet

(51) Int. Cl.
*B60H 1/00* (2006.01)
*B60H 1/24* (2006.01)
*B60H 1/26* (2006.01)
*B60H 3/06* (2006.01)
*B01D 46/00* (2006.01)

(52) U.S. Cl.
CPC ..... *B60H 1/00021* (2013.01); *B60H 1/00657* (2013.01); *B60H 1/00828* (2013.01); *B60H 1/248* (2013.01); *B60H 1/26* (2013.01); *B60H 3/0633* (2013.01); *B60H 3/0641* (2013.01); *B01D 2279/50* (2013.01); *B60H 2001/00099* (2013.01)

(58) Field of Classification Search
CPC .. B60H 1/00021; B60H 3/0078; B60H 1/248; B60H 1/26; B60H 3/0633; B60H 3/0641; B60H 2001/00099
See application file for complete search history.

(56) References Cited

U.S. PATENT DOCUMENTS

| | | |
|---|---|---|
| 2004/0194479 A1 | 10/2004 | Umebayashi et al. |
| 2006/0026936 A1 | 2/2006 | Paumier et al. |
| 2008/0202139 A1 | 8/2008 | Darroman et al. |
| 2009/0193825 A1 | 8/2009 | Hara |
| 2012/0241126 A1 | 9/2012 | Kishi |

FOREIGN PATENT DOCUMENTS

| | | |
|---|---|---|
| CN | 105115107 A | 12/2015 |
| DE | 39 31 914 A1 | 4/1991 |
| DE | 195 48 548 A1 | 6/1997 |
| DE | 299 11 519 U1 | 11/2000 |
| DE | 10 2004 004 302 A1 | 8/2004 |
| DE | 10 2008 005 365 A1 | 8/2008 |
| DE | 60 2005 004 078 T2 | 1/2009 |
| DE | 10 2007 043 601 A1 | 3/2009 |
| DE | 10 2010 053 345 A1 | 6/2012 |
| DE | 10 2012 204 529 B4 | 12/2016 |
| EP | 3 236 040 A1 | 10/2017 |
| FR | 2 958 219 A1 | 10/2011 |
| WO | WO 2008/047260 A2 | 4/2008 |

OTHER PUBLICATIONS

Machine translation of CN 105115107 (Year: 2015).*
International Search Report (PCT/ISA/210) issued in PCT Application No. PCT/EP2017/069648 dated Nov. 10, 2017 with English translation (five pages).
German-language Written Opinion (PCT/ISA/237) issued in PCT Application No. PCT/EP2017/069648 dated Nov. 10, 2017 (six pages).
German-language Search Report issued in counterpart German Application No. 10 2016 215 853.8 dated Jul. 5, 2017 with partial English translation (12 pages).
Chinese-language Office Action issued in Chinese Application No. 201780037771.X dated Aug. 25, 2020 with English translation (15 pages).

* cited by examiner

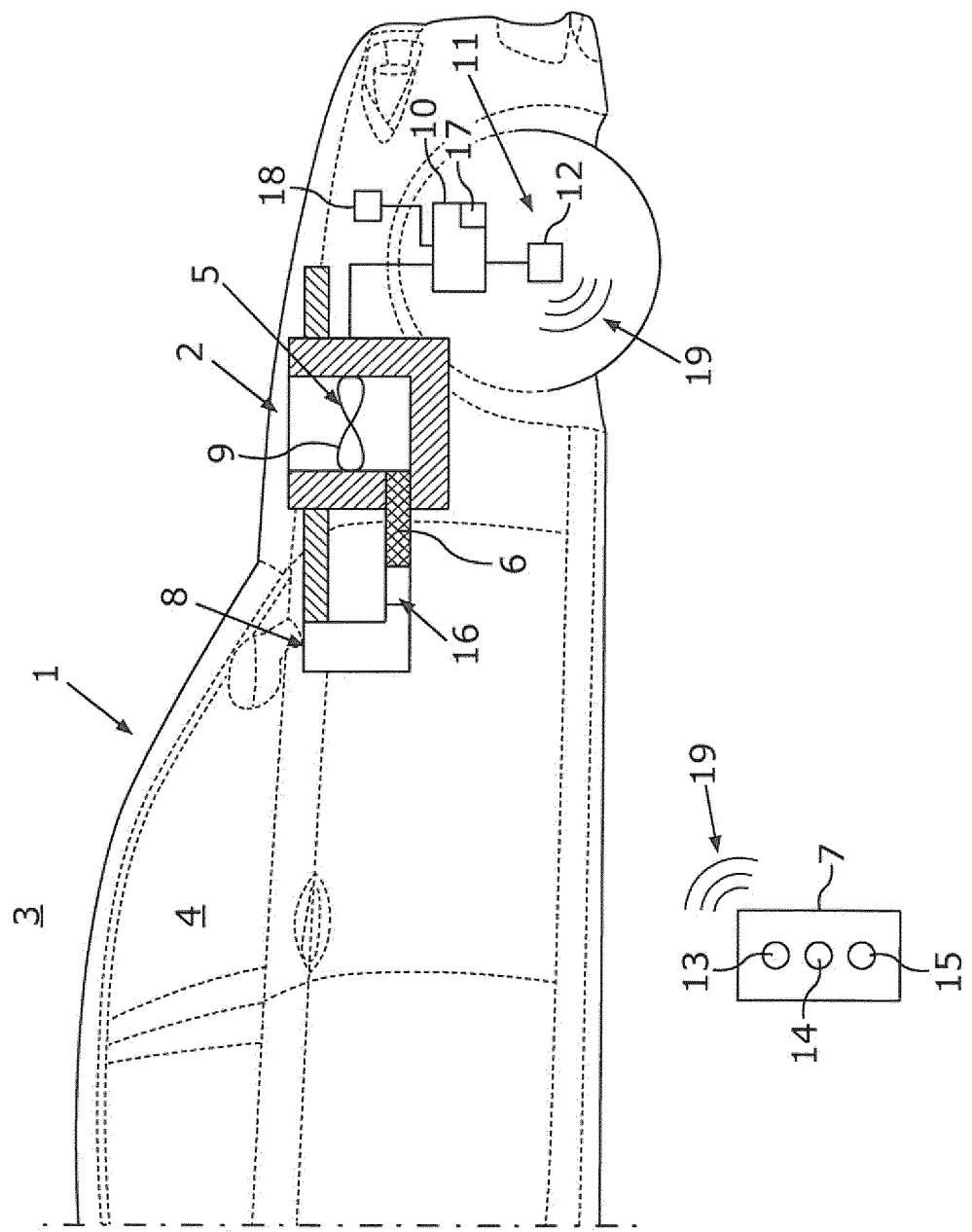

FILTER APPARATUS FOR A MOTOR VEHICLE, AND METHOD FOR OPERATING SUCH A FILTER APPARATUS

CROSS REFERENCE TO RELATED APPLICATIONS

This application is a continuation of PCT International Application No. PCT/EP2017/069648, filed Aug. 3, 2017, which claims priority under 35 U.S.C. § 119 from German Patent Application No. 10 2016 215 853.8, filed Aug. 23, 2016, the entire disclosures of which are herein expressly incorporated by reference.

BACKGROUND AND SUMMARY OF THE INVENTION

The invention relates to a filter apparatus for a motor vehicle and to a method for operating such a filter apparatus.

Such a filter apparatus for a motor vehicle and a method for operating such a filter apparatus are already known, for example, from DE 39 31 914 A1. The filter apparatus includes a delivery device which can be operated independently of a ventilation system of the motor vehicle and is provided in addition to the ventilation system and has the purpose of drawing in and delivering air from the passenger compartment of the vehicle. Within the scope of the method, the delivery device is therefore operated independently of the ventilation system, provided in any case, of the motor vehicle and therefore, for example, independently of a drive assembly for driving the motor vehicle. The delivery device is activated by the operation of the delivery device, as a result of which air from the passenger compartment of the vehicle is drawn in by way of the delivery device and delivered through at least one filter element of the filter apparatus. The air which is drawn in and delivered by way of the delivery device therefore flows through the filter element by way of which the air is filtered. In addition, the filter apparatus has at least one outlet via which the air which is filtered by way of the filter element can be introduced into the passenger compartment.

An object of the present invention is to further develop a filter apparatus and a method of the type mentioned at the beginning in such a way that the air in the passenger compartment of the motor vehicle can be filtered particularly appropriately with respect to requirements.

This and other objects are achieved by way of a filter apparatus and/or by way of a method in accordance with embodiments of the invention.

A first aspect of the invention relates to a filter apparatus for a motor vehicle, in particular for a car such as, for example, a passenger car. The filter apparatus includes a delivery device which can be operated independently of a ventilation system of the motor vehicle and is provided or is to be provided, that is to say can be used, in addition to the ventilation system and has the purpose of drawing in and delivering air from the passenger compartment of the motor vehicle.

The delivery device is therefore a component which is provided in addition to the ventilation system, provided, for example, permanently installed in any case, of the motor vehicle, which is different from the ventilation system and which can be operated, that is to say activated, while the actual ventilation system, provided and permanently installed in any case, of the motor vehicle is deactivated. The ventilation system includes, for example, a heating and/or air-conditioning system with a blower for delivering air into the passenger compartment. In this context, the delivery device can be operated and therefore activated while the blower is deactivated. In particular, it is possible for the delivery device to be able to be operated, for example, while a drive assembly for driving the motor vehicle, in particular an ignition of the drive assembly, is deactivated. If the filter apparatus is operated, the filter apparatus is activated.

The filter apparatus also includes at least one filter element through which air, which is drawn in and delivered by way of the delivery device, can flow and by way of which the air can be filtered. The filter element is preferably also a component which is different from the ventilation system and is provided in addition thereto. In addition, the filter apparatus has at least one outlet for introducing the air, filtered by way of the filter element, into the passenger compartment. This means that by way of the delivery device the air is drawn in from the passenger compartment and delivered through the filter element and through the outlet, with the result that the drawn-in air from the passenger compartment is filtered by way of the filter element and then introduced again into the passenger compartment. As a result, the air which is located in the passenger compartment is filtered and, in particular, noxious substances are removed from it, with the result that particularly good air quality can be ensured in the passenger compartment. The filter apparatus can be operated, for example, independently of the blower of the ventilation system here, in particular when the blower is deactivated, said ventilation system also being referred to as a ventilation device. The blower usually does not operate until the drive assembly is started or its ignition has been switched on, with the result that, for example, the heating system and/or air-conditioning system of the motor vehicle is running. However, by way of the filter apparatus it is possible to filter, and therefore condition, the air from the passenger compartment while the ventilation system, in particular the drive assembly and therefore, for example, the blower, are deactivated.

In order then to be able to filter and therefore clean the air from the passenger compartment of the motor vehicle particularly appropriately with respect to requirements it is provided according to the invention that the filter apparatus is designed to receive wirelessly at least one signal which is made available by a terminal and to activate the delivery device as a function of the signal. The terminal is a remote control element which can make available the at least one signal or can cause, for example, the signal to be made available wirelessly. In particular, the terminal can be a computer, in particular a PC (personal computer) which can be operated by a user. By way of this operator control, for example a user can make inputs into the computer or into the terminal. By way of such inputting, the user can, for example, cause the signal to be made available. The filter apparatus can receive wirelessly the signal which is made available, that is to say without being connected to the terminal via a physical line, and can activate the delivery device as a function of the received signal.

The signal can be transmitted to the filter apparatus and received from the filter apparatus wirelessly, that is to say without a physically present line. The delivery device is activated as a function of the signal so that the filtering and therefore the cleaning of the air which is located in the passenger compartment can be brought about wirelessly by way of the remote control element. It is therefore possible to activate the filtering and therefore cleaning of the air which is located in the passenger compartment, without the remote control element being connected to the filter apparatus via cables or lines. The filter apparatus according to the invention is therefore embodied as a remote filter apparatus, since the delivery device can be activated, for example, by a person who uses the mobile terminal and is not located in the passenger compartment but rather is, for example, outside the motor vehicle and is at some distance therefrom, said person also being referred to as a user.

Since the filter apparatus is used in addition to the blower of the ventilation system and therefore, for example, in addition to a heating and/or air-conditioning system of the motor vehicle, the filter apparatus according to the invention is embodied as a remote additional air cleaner which can be operated, that is to say activated, independently of the blower and independently of the ventilation system. The signal is, for example, transmitted to the filter apparatus and received from the filter apparatus wirelessly by way of radio technology. Alternatively or additionally, other wireless signal transmissions are also contemplated.

By virtue of the possibility of being able to activate and therefore remote-control the filter apparatus by way of the terminal, it is possible for the user to activate the filter apparatus before the user enters the motor vehicle or before the user starts the drive assembly or the ventilation system. It is therefore possible, for example, that even when the user enters the motor vehicle there is particularly good air quality in the passenger compartment, since the air has already been cleaned by way of the filter apparatus before the user enters the motor vehicle. Therefore, particularly high air quality is already present at the start of the journey, which benefits the driving comfort and safe control of the motor vehicle.

Since the filter apparatus can be activated appropriately with respect to requirements before the user enters the motor vehicle, the air located in the passenger compartment can be pre-conditioned. As a result, for example, disruptive and/or excessively loud noises while the user is in the passenger compartment can be avoided, since particularly intensive cleaning of the air can be avoided while the user is in the passenger compartment. This intensive cleaning of the air can be carried out by way of the filter apparatus before the user enters the motor vehicle. In other words, the intensive cleaning of the air can be carried out within the scope of the pre-conditioning.

Furthermore, the invention is based on the realization that filters of conventional ventilation systems, in particular heating and/or air-conditioning systems, of motor vehicles have to accept a compromise between fine-dust specification and loss of pressure. Such a compromise does not have to be accepted by the filter element of the filter apparatus according to the invention, since the filter apparatus is used as an additional filter apparatus which is provided in addition to the heating and/or air-conditioning system which is provided in any case. As a result, the air which is located in the passenger compartment and which is also referred to as interior air or passenger compartment air is filtered and therefore cleaned particularly effectively and efficiently.

In particular it is contemplated that the terminal is embodied as a mobile terminal which can be carried, for example, by a person. The mobile terminal is, for example, a remote control system which is provided specifically for the filter apparatus and which has, for example, at least one operator control element for causing the signal to be made available. In particular it is contemplated to integrate such a remote control system for performing remote control of the filter apparatus into an already existing remote control system for a stationary heating system of the motor vehicle.

Furthermore, it is contemplated that the mobile terminal is embodied as a mobile communication terminal or as a mobile radio device, so that the mobile terminal is embodied, for example, as a cell phone, smartphone or tablet PC. The mobile terminal is designed, for example, to execute a software application, simply also referred to as an App, so that, for example, the software application can cause the signal to be made available. The software application makes available a virtual operator control element in the form of a control interface, for example, on a touch-sensitive display of the mobile communication terminal. If, for example, the user touches the touch-sensitive display in the region of the control interface with his finger, this causes the signals to be made available wirelessly. The touch-sensitive display is therefore embodied, for example, as a touch-sensitive screen or as a touchscreen.

In addition it is possible that the filter apparatus is designed to carry out subsequent cleaning of the interior air, wherein within the scope of the subsequent cleaning the delivery device is operated and therefore the interior air is filtered and therefore cleaned after the user has already exited the passenger compartment. Alternatively or additionally it is contemplated that a proximity-detection device is provided which detects proximity of the user to the motor vehicle. If the proximity-detection device detects that a distance between the user and the motor vehicle undershoots a predefinable threshold value, the delivery device is activated automatically. As a result, the interior air can also be filtered and therefore cleaned before the user actually enters the passenger compartment or the motor vehicle.

Furthermore there can be provision that the delivery device is activated automatically if the motor vehicle, in particular at least one energy store of the motor vehicle, is connected electrically to a power source, in particular a power supply system, for example via a socket. The power source is an external power source which is different from the motor vehicle. This is to be understood as meaning that the power source is not a component of the motor vehicle. For example, the power source is a power supply system.

In this context, the motor vehicle is embodied, for example, as a hybrid vehicle or as an electric vehicle, wherein electrical energy or electric current can be stored by way of the energy store. The motor vehicle includes here at least one electric machine by way of which the motor vehicle is driven. In order to drive the motor vehicle by way of the electric machine, the electric machine is operated in a motor mode and therefore as an electric motor. In the motor mode, the electric machine is supplied with electric current, for example electrical energy, which is stored in the energy store. As a result, the quantity of electrical energy stored in the energy store is reduced. As a result of the electrical connection of the energy store to the power source it is possible to store in the energy store electrical energy which is made available by the power source, in order as a result to increase the quantity of electrical energy which is stored in the energy store. The energy store is embodied, for example, as a battery, in particular as a high-voltage battery (HV battery). The electric machine is the abovementioned drive assembly or component of the drive assembly.

In this context, preferably a detection device is provided by way of which it is possible to detect connection of the motor vehicle, in particular of the energy store, to the power source. If it is detected that the motor vehicle, in particular the energy store, is connected to the power source, the delivery device is activated automatically. As a result, electrical energy which is made available by the power supply system can be used, for example, to operate the delivery device.

Moreover, it is possible that at least one distance between the terminal and the filter apparatus or the motor vehicle is determined as a function of the received signal, in particular by way of an electronic computer device. The electronic computer device can be here a component of the motor vehicle or a computer device which is different from the motor vehicle, is external with respect to the motor vehicle and is also referred to as a server or back-end. If it is detected, for example on the basis of the wirelessly received signal, that the distance between the terminal and the filter apparatus undershoots a predefinable threshold value, the delivery device is activated. If the terminal is a mobile terminal which is carried by a person, the distance between the filter apparatus and the terminal corresponds to a distance between the person and the motor vehicle. As a function of the signal it is therefore possible to determine that the person is approaching the motor vehicle and plans, for example, to enter the motor vehicle in the near future. The delivery device can then be started, in particular, automatically, that is to say without involvement of a person, before the person enters the motor vehicle.

In a particularly advantageous refinement of the invention, the filter apparatus includes at least one ionizer for ionizing the air which is drawn in and delivered by way of the delivery device. As a result, particularly high air quality in the passenger compartment can be implemented.

A further embodiment is defined by the fact that an electronic computer device is provided with a memory in which data which characterizes at least one time can be stored. The computer device is, for example, a component of the filter apparatus or of the motor vehicle or else an external component which is different from the filter apparatus and the motor vehicle, wherein the computer device is, for example, an, in particular, positionally fixed server or a back-end. The computer device, which is also referred to as a control device, is designed to activate the delivery device automatically at the time as a function of the stored data. As a result, for example, the user can store in the memory the time at which the delivery device is to be started, with the result that the delivery device is then activated automatically at the time without the involvement of the user. The cleaning of the interior air then starts at the stored time.

Alternatively or additionally it is contemplated that data which characterize a time are stored in the memory, wherein the control unit (e.g., computer device) is designed to deactivate the delivery device automatically at the time as a function of the stored data. This makes it possible to end the cleaning of the interior air appropriately with respect to requirements and automatically.

In one particularly advantageous embodiment of the invention, the signal characterizes the respective time, wherein the computer device is designed to store the data in the memory as a function of the signal. The user therefore has the possibility of storing in the memory, by way of the signal and therefore wirelessly, the respective time at which the delivery device is to be activated or ended. The user can therefore program the delivery device without having to enter the motor vehicle. The programming is to be understood as meaning the storage of the respective time in the memory. The programming of the delivery device can be carried out, in particular, by way of the mobile terminal, in particular by way of the software application. By way of the software application, the user enters, for example, a first time at which the delivery device is to be activated, and a second time at which the delivery device is to be deactivated. These times or data which characterize these times are transferred wirelessly to the filter apparatus and received thereby by way of the mobile terminal and by way of the signal. The electronic computer device stores the data and therefore the times in the memory as a function of the signal, so that by way of the computer device the delivery device is automatically activated at the first time and automatically deactivated at the second time. As a result, the user can program the filter apparatus without having to enter the motor vehicle.

It has also proven particularly advantageous if the filter apparatus is designed to draw in air from the passenger compartment of the motor vehicle and discharge it to the surroundings of the motor vehicle by way of the delivery device. For this purpose, the filter apparatus comprises, for example, at least one outlet which opens into the surroundings and via which the air which is drawn in from the passenger compartment and delivered by way of the delivery device is discharged or delivered to the surroundings. This air which is sucked in or drawn in from the passenger compartment and discharged to the surroundings is preferably filtered by way of the filter element.

The drawing in of the air from the passenger compartment and the introduction of the air which is drawn in from the passenger compartment and filtered by way of the filter element into the passenger compartment are also referred to as circulation or circulation mode. The drawing in of the air from the passenger compartment and the discharging of the air which has been drawn in from the passenger compartment to the surroundings of the motor vehicle are also referred to as discharging or discharge mode.

It is proven advantageous here if the delivery device can be operated in a first delivery direction in the circulation mode or in order to implement the circulation mode, so that the air is delivered in a first delivery direction by way of the delivery device. The delivery device can be operated, for example, in a second delivery direction opposed to the first delivery direction in the discharge mode or in order to implement the discharge mode, so that the air is delivered, by way of the delivery device, in a second delivery direction which is opposed to the first delivery direction. As a result, by way of the same delivery device it is possible to implement two different operating states in the form of the circulation mode and the discharge mode.

In particular it is contemplated, in the discharge mode, to suck in or draw in the air from the passenger compartment at at least one location which is arranged in the transverse direction of the vehicle, between two seats at the height of a headrest of a seat assembly which is embodied, for example, as a rear seat bench. It is therefore possible, for example, effectively to draw in air from the passenger compartment if a vehicle occupant who is located in the passenger compartment smokes. In circulation mode, the outlet via which the circulated and filtered air is introduced into the passenger compartment is arranged at said location. The location is arranged near to the vehicle occupants, so that the air can be effectively drawn in or introduced into the passenger compartment.

A second aspect of the invention relates to a filter apparatus for a motor vehicle. The filter apparatus includes a delivery device which can be operated independently of a ventilation system of the motor vehicle and is provided in addition to the ventilation system and has the purpose of drawing in and delivering air from the passenger compartment of the motor vehicle. In addition, the filter apparatus includes at least one filter element through which air which has been drawn in and delivered by way of the delivery device flows, and has the purpose of filtering the air. Furthermore, the filter apparatus has at least one outlet for introducing the air filtered by way of the filter element into the passenger compartment.

In order then to implement filtering and therefore cleaning of the air particularly appropriately with respect to requirements, the invention provides an electronic computer device with a memory and is designed to store in the memory data which characterize at least one time, and to activate and/or deactivate the delivery device automatically as a function of the stored data.

For example, a user of the filter apparatus can input data into the memory via the abovementioned terminal, wherein the data characterize times. For example, the data characterize a first time at which the initially deactivated delivery device is to be activated automatically. Moreover, the data characterize, for example, a second time at which the initially activated delivery device is to be deactivated automatically. By storing the data, the user can program the filter apparatus, since the delivery device is automatically started or activated at the first time and deactivated at the second time by way of the computer device, and since these times can be predefined by the user, in particular via the terminal. Advantages and advantageous refinements of the first aspect of the invention are to be considered advantages and advantageous refinements of the second aspect of the invention, and vice versa.

It has proven particularly advantageous if the electronic computer device is designed to detect times at which the motor vehicle and/or the filter apparatus is put into operation, to store data which characterize their detected times in the memory and to activate automatically the delivery device as a function of the stored data. The filter apparatus is therefore embodied as a self-teaching system which learns the times itself or automatically and subsequently automatically activates the delivery device at the learned times. The electronic computer device can be a component of the motor vehicle or a component which is external with respect thereto here.

A third aspect of the invention relates to a method for operating a filter apparatus for a motor vehicle. In the method, a delivery device of the filter apparatus is operated independently of a ventilation system of the motor vehicle so that the delivery device is made available in addition to the ventilation system which is, for example, provided and permanently installed in any case. The motor vehicle therefore has the ventilation system and the delivery device which is provided in addition to the ventilation system and is different from the ventilation system. The ventilation system has, for example, at least one blower for delivering air, wherein the delivery device of the filter apparatus is a component which is different from the blower and provided in addition thereto.

As a result of the operation of the delivery device, by way of the delivery device air is drawn in from the passenger compartment of the vehicle and delivered through at least one filter element by way of which the air is filtered and as a result cleaned. In addition, within the scope of the method the filtered air is introduced into the passenger compartment via at least one outlet of the filter apparatus. A process within the scope of which the air is drawn in from the passenger compartment and then introduced again into the passenger compartment is also referred to as circulation, so that the air from the passenger compartment is circulated by way of the filter apparatus or within the scope of the method and in the process filtered and therefore cleaned. The delivery device is preferably operated here while the ventilation system, in particular the blower, is deactivated.

In order then to implement filtering and therefore cleaning of the air particularly appropriately with respect to requirements there is provision according to the invention that by way of the filter apparatus at least one signal which is made available by a mobile terminal is received wirelessly and the delivery device is activated as a function of the signal. Advantages and advantageous refinements of the first and second aspects of the invention are to be considered advantages and advantageous refinements of the third aspect of the invention, and vice versa.

For the wireless reception of the signal, the filter apparatus includes, for example, at least a communication device by way of which the signal which is, for example, made available wirelessly can be received. For this purpose, the communication device comprises, for example, a receiver for the wireless reception of the signal.

A fourth aspect of the invention relates to a method for operating a filter apparatus for a motor vehicle. In the method, a delivery device of the filter apparatus is operated independently of a ventilation system of the motor vehicle, so that the delivery device is made available in addition to the ventilation system which is, for example, provided and permanently installed in any case. The motor vehicle therefore has the ventilation system and the delivery device which is provided in addition to the ventilation system and is different from the ventilation system. The ventilation system has, for example, at least one blower for delivering air, wherein the delivery device of the filter apparatus is a component which is different from the blower and is provided in addition thereto.

As a result of the operation of the delivery device, by way of the delivery device air is drawn in from the passenger compartment of the vehicle and delivered through at least one filter element by way of which the air is filtered and as a result cleaned. In addition, within the scope of the method the filtered air is introduced into the passenger compartment via at least one outlet of the filter apparatus. A process within the scope of which the air is drawn in from the passenger compartment and then introduced again into the passenger compartment is also referred to as circulation, so that the air from the passenger compartment is circulated by way of the filter apparatus or within the scope of the method and in the process filtered and therefore cleaned. The delivery device is preferably operated here while the ventilation system, in particular the blower, is deactivated.

In order then to implement filtering and therefore cleaning of the air particularly appropriately with respect to requirements there is provision according to the invention that by way of an electronic computer device having a memory, data which characterize at least one time are stored in the memory, and the delivery device is automatically activated and/or deactivated as a function of the stored data. Advantages and advantageous refinements of the first, the second and the third aspects of the invention are to be considered advantages and advantageous refinements of the fourth aspect of the invention, and vice versa.

The invention also includes a motor vehicle which is embodied, for example, as a car, in particular as a passenger car and has at least one filter apparatus according to the invention. Advantages and advantageous refinements of the first, second, third and fourth aspects of the invention are to be considered advantages and advantageous refinements of the motor vehicle according to the invention, vice versa.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic illustration of a filter apparatus for a motor vehicle, wherein the filter apparatus is designed to receive wirelessly at least one signal which is made available by a terminal, and to activate a delivery device of the filter apparatus as a function of the signal.

DETAILED DESCRIPTION OF THE DRAWING

FIG. 1 shows a detail of a schematic and sectional side view of a motor vehicle 1 which is embodied, for example, as a car, in particular as a passenger car, and which includes a filter apparatus 2. In addition, the motor vehicle 1 includes a permanently installed ventilation system (not illustrated in the FIGURE) which includes, for example, an air-conditioning system. The air-conditioning system is also referred to as an air-conditioning device. The ventilation system includes a blower by way of which air, for example from the surroundings 3 of the motor vehicle 1, can be drawn in and introduced into the passenger compartment 4 of the motor vehicle 1. In addition, the motor vehicle 1 includes a drive unit (not illustrated in the FIGURE) by way of which the motor vehicle 1 can be driven. The ventilation system and therefore the blower run, for example, only when the drive unit, or the ignition thereof, is activated.

The filter apparatus 2 is a component which is different from the ventilation system, is provided in addition to the ventilation system and whose function and operation are explained in more detail below. The filter apparatus 2 includes a delivery device 5 which can be operated independently of the ventilation system and independently of the drive assembly, in particular independently of the ignition thereof, and has the purpose of drawing in and delivering air from the passenger compartment 4. The air which is located in the passenger compartment 4 is also referred to as interior air or passenger compartment air. The delivery device 5 is therefore a component which is different from the ventilation system which is provided and permanently installed in any case, is provided in addition to the ventilation system, in particular in addition to the blower of the ventilation system, and can be operated independently of the ventilation system, in particular of the blower.

The delivery device 5 can be operated and therefore activated, while the drive unit, in particular the ignition, or the ventilation system, in particular the blower, thereof, are deactivated. The delivery device 5 can, for example, be operated electrically and is supplied with electric current or electrical energy in order to operate the delivery device 5. This electrical energy is stored, for example, in an energy store (not illustrated in the FIGURE) of the motor vehicle 1 and is fed to the delivery device 5 when the latter is activated.

The filter apparatus 2 also includes at least one filter element 6 through which air which is drawn in and delivered by way of the delivery device 5 can flow and which has the purpose of filtering the air. In other words, if the delivery device 5 is operated so that the air from the passenger compartment 4 is drawn in and delivered by way of the delivery device, the air is delivered through the filter element 6 by way of the delivery device 5, as a result of which the air is filtered and as a result cleaned by way of the filter element 6. The filter apparatus 2 also includes at least one outlet 8 via which the air which is filtered by way of the filter element 6 can be introduced into the passenger compartment 4. This means that the air which is drawn in by way of the delivery device 5 and cleaned by way of the filter element 6 is introduced again into the passenger compartment 4 via the outlet 8. This process is also referred to as circulation of the interior air, wherein the interior air is cleaned by way of the filter element 6 within the scope of the circulation.

In order then to be able to set particularly high air quality in the passenger compartment 4 appropriately with respect to requirements, the filter apparatus 5 is designed to receive wirelessly at least one signal 19 which is made available, for example, wirelessly by a mobile terminal 7, and to activate the delivery device 5 as a function of the signal 19.

The delivery device 5 includes, for example, an impeller wheel 9 and an electric motor (not illustrated in the FIGURE) which is provided in addition to the blower and in addition to the drive assembly and by way of which the impeller wheel 9 can be driven. In addition, the filter apparatus 2 includes an electronic computer device 10 which is also referred to as a control unit. The control unit is connected to the electric motor, so that the electric motor can be actuated by the control unit. By way of this actuation, the electric motor can be activated by the control unit, as a result of which the impeller wheel 9 is driven by the electric motor. Alternatively it is contemplated that the electronic computer device 10 is, for example, a positionally fixed electronic computer device which is different from the filter apparatus 2 and the motor vehicle 1 and is embodied, for example, as a server or back-end and can communicate wirelessly, for example via the Internet, with the motor vehicle 1 or the filter apparatus 2.

In addition, the filter apparatus 2 includes a communication device 11 with at least one receiver element 12 by way of which the signal 19 which is made available wirelessly can be received wirelessly. The receiver element 12 is connected to the computer device 10. If the receiver element 12 receives the signal 19 wirelessly, for example the receiver element 12 transfers an actuation signal to the control unit which receives the actuation signal. The electric motor is actuated by way of the control unit as a function of the actuation signal, in order as a result to drive the impeller wheel 9 by way of the electric motor. The delivery device 5 is therefore activated by way of the control unit as a function of the received signal 19. As a result of the actuation of the delivery device 5, the air is drawn in, delivered and therefore cleaned in the described way by way of the delivery device 5.

The wireless provision of the signal 19 can be brought about, for example, by way of the mobile terminal 7, by a person using the mobile terminal 7, said person also being referred to as a user. The mobile terminal 7 is therefore a remote control system for the filter apparatus 2.

In the exemplary embodiment illustrated in the FIGURE, the mobile terminal 7 has three operator control elements 13, 14 and 15. The respective operator control element 13, 14 or 15 is embodied, for example, as a mechanical operator control element, which can be moved relative to a housing of the mobile terminal 7. For example, by activating the respective operator control element 13, 14 or 15 the person can move the respective operator control element 13, 14 or 15 out of a home position into an activation position. In particular, the respective operator control element 13, 14 or 15 is embodied, for example, as a push button key which returns from the activation position into the home position by way of a spring force made available by a spring if the person (user) releases the respective operator control element 13, 14 or 15.

For example, the filter apparatus 2 can be basically activated and deactivated by way of the operator control element 13. In the activated state, the filter apparatus 2 is able to receive the signal 19. In the deactivated state, the filter apparatus 2 is, for example, not able to receive the signal 19, in particular not even if the signal 19 is made available wirelessly by the mobile terminal 7.

In order therefore to be able to activate the delivery device 5 by way of the signal 19, the user must initially switch, for example, the filter apparatus 2 from the deactivated state into the activated state by way of the operator control element 13. If, for example, the user subsequently activates the operator control element 14, the signal 19 is made available by the mobile terminal 7. Since the filter apparatus 2 is in its activated state, the receiver element 12 can receive the signal 19, as a result of which the delivery device 5 is activated in the way described.

As a result of activation of the operator control element 15, the user can, for example, cause the mobile terminal 7 to make available wirelessly at least one second signal. If the filter apparatus 2 is in its activated state, the receiver element 12 can receive wirelessly the second signal which was made available wirelessly. The electric motor is actuated by the control unit as a function of the second signal, as a result of which the electric motor and therefore the delivery device 5 are deactivated. This means that the user activates the delivery device 5 by activating the operator control element 14, and can deactivate the delivery device 5 by activating the operator control element 15, in particular when the filter apparatus 2 is in its activated state.

The filter apparatus 2 is therefore embodied as a remote additional air cleaner, since the filter apparatus 2 is used in addition to the air-conditioning system and can filter and as a result clean the interior air by way of the filter element 6. It has proven particularly advantageous if the filter apparatus 2 has at least one ionizer 16 for ionizing the air which is drawn in and delivered by way of the delivery device 5. As a result, particularly high air quality can be implemented in the passenger compartment 4.

The electronic computer device 10 includes, for example, a memory 17 in which respective data can be stored. First data items here characterize, for example, a first time, wherein second data items here characterize, for example, a second time. The control unit is preferably designed to activate the delivery device 5 automatically at the first time as a function of the stored first data. In addition, the control unit is preferably designed to deactivate the delivery device 5 at the second time as a function of the second data. The data can be transmitted, for example, wirelessly to the receiver element 12 and via the latter to the control unit and be received by the control unit by way of the signal 19, so that the user can program the filter apparatus 2 without having to enter the passenger compartment 4. This programming is to be understood as meaning that the respective data and therefore the respective times are stored in the memory 17.

In addition, by activating the operator control element 14, the user can activate the delivery device 5 without having to enter the passenger compartment. As a result, the air in the passenger compartment 4 can be cleaned before the user actually enters the passenger compartment 4. This is also referred to as pre-conditioning of the interior air so that particularly high air quality is already present in the passenger compartment 4 when the user enters the passenger compartment 4. As a result of the pre-conditioning, particularly high passenger compartment air quality can already be implemented when it is entered, so that a particularly high level of driving comfort and a particularly high level of safety can be provided. Since the pre-conditioning and therefore, for example, intensive cleaning of the air can be carried out before the user enters the passenger compartment 4, excessive cleaning noise, which occurs while the user is in the passenger compartment 4, can be avoided. This also benefits the driving comfort. In addition, particularly comfortable actuation of the filter apparatus 2 can be implemented by way of the mobile terminal 7.

Moreover it is contemplated that the filter apparatus 2 has a detection device 18 by way of which a distance between the motor vehicle 1 and the mobile terminal 7 can be detected. Since the user carries the mobile terminal 7 with him, the distance between the motor vehicle 1 and the mobile terminal 7 corresponds to the distance between the motor vehicle 1 and the user. If, for example, it is detected by way of the detection device 18 that the distance between the mobile terminal 7 and the motor vehicle 1 undershoots a predefinable threshold value, the delivery device 5 is, for example, activated automatically by way of the control unit (e.g., computer device 10). For this purpose, a second actuation signal is transmitted, for example, by the detection device 18 to the control unit. The control unit actuates the electric motor as a function of the second actuation signal, in order thereby to activate the electric motor and therefore the delivery device 5. As a result, particularly comfortable operator control of the filter apparatus 2 can be implemented.

A further advantage of the invention is that the filter element 6 can be exchanged or serviced particularly easily and therefore favorably in terms of time and cost. A further advantage is that the interior air can be cleaned without operating the air-conditioning system. As a result of this operation of the filter apparatus 2 which is independent of the air-conditioning system it is possible to clean the interior air particularly efficiently in terms of energy and therefore with low consumption of energy.

LIST OF REFERENCE NUMBERS

| | |
|---|---|
| 1 | Motor vehicle |
| 2 | Filter apparatus |
| 3 | Surroundings |
| 4 | Passenger compartment |
| 5 | Delivery device |
| 6 | Filter element |
| 7 | Mobile terminal |
| 8 | Outlet |
| 9 | Impeller wheel |
| 10 | Electronic computer device |
| 11 | Communication device |
| 12 | Receiver element |
| 13 | Operator control element |
| 14 | Operator control element |
| 15 | Operator control element |
| 16 | Ionizer |
| 17 | Memory |
| 18 | Detection device |
| 19 | Signal |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A filter apparatus for a motor vehicle, comprising:
a delivery device, which is operable independently of a ventilation system of the motor vehicle and is provided in addition to the ventilation system in order to draw in and to deliver air from a passenger compartment of the motor vehicle and to discharge air from the passenger compartment into air surrounding the motor vehicle;

at least one filter element through which air which is drawn in and delivered by way of the delivery device flows and filters the air; and at least one outlet for introducing the air filtered by way of the filter element into the passenger compartment, wherein the filter apparatus is configured to receive wirelessly at least one signal which is made available by a terminal and to activate the delivery device as a function of the signal.

2. The filter apparatus according to claim 1, wherein the filter apparatus includes at least one ionizer for ionizing the air which is drawn in and delivered by way of the delivery device.

3. The filter apparatus according to claim 1, wherein the filter apparatus includes an electronic computer device with a memory in which data characterizing a time can be stored, and the computer device is configured to activate the delivery device automatically at the time as a function of the stored data.

4. The filter apparatus according to claim 2, wherein the filter apparatus includes an electronic computer device with a memory in which data characterizing a time can be stored, and the computer device is configured to activate the delivery device automatically at the time as a function of the stored data.

5. The filter apparatus according to claim 1, wherein the filter apparatus includes an electronic computer device with a memory in which data characterizing a time can be stored, and the computer device is configured to deactivate the delivery device automatically at the time as a function of the stored data.

6. The filter apparatus according to claim 2, wherein the filter apparatus includes an electronic computer device with a memory in which data characterizing a time can be stored, and the computer device is configured to deactivate the delivery device automatically at the time as a function of the stored data.

7. The filter apparatus according to claim 3, wherein the signal characterizes the time, and the computer device is configured to store the data in the memory as a function of the signal.

8. The filter apparatus according to claim 5, wherein the signal characterizes the time, and the computer device is configured to store the data in the memory as a function of the signal.

9. The filter apparatus according to claim 1, wherein the filter apparatus is configured to draw in air from the passenger compartment and discharge the air to surroundings of the motor vehicle by way of the delivery device.

10. The filter apparatus according to claim 1, wherein the filter apparatus includes at least one ionizer for ionizing the air drawn in from the passenger compartment and delivered by way of the delivery device.

11. A method for operating a filter apparatus for a motor vehicle, the method comprising the acts of:

operating a delivery device of the filter apparatus independently of a ventilation system of the motor vehicle, the delivery device being configured to deliver air from a passenger compartment of the motor vehicle and to discharge air from the passenger compartment into air surrounding the motor vehicle;

drawing in air from a passenger compartment of the motor vehicle by way of the delivery device;

delivering the air through at least one filter element, by way of which the air is filtered; and either introducing the filtered air into the passenger compartment via at least one outlet of the filter apparatus or discharging the filtered air from the passenger compartment into air surrounding the motor vehicle, wherein by way of the filter apparatus, at least one signal which is made available by a mobile terminal is wirelessly received and the delivery device is activated as a function of the signal.

* * * * *